(12) United States Patent
Anbe et al.

(10) Patent No.: US 7,851,537 B2
(45) Date of Patent: Dec. 14, 2010

(54) RUBBER COMPOSITION FOR TIRE AND TIRE

(75) Inventors: Mitsuharu Anbe, Ichihara (JP); Naomi Okamoto, Ichihara (JP); Takashi Wada, Ichihara (JP)

(73) Assignee: UBE Industries, Ltd. (JP)

( * ) Notice: Subject to any disclaimer, the term of this patent is extended or adjusted under 35 U.S.C. 154(b) by 15 days.

(21) Appl. No.: 11/577,475

(22) PCT Filed: Jan. 16, 2007

(86) PCT No.: PCT/JP2007/050452

§ 371 (c)(1),
(2), (4) Date: Feb. 26, 2009

(87) PCT Pub. No.: WO2007/081018

PCT Pub. Date: Jul. 19, 2007

(65) Prior Publication Data

US 2009/0176910 A1   Jul. 9, 2009

(51) Int. Cl.
*C08K 3/34* (2006.01)
*C08J 5/14* (2006.01)

(52) U.S. Cl. .................................... 524/493; 523/157
(58) Field of Classification Search .................. 524/493
See application file for complete search history.

(56) References Cited

FOREIGN PATENT DOCUMENTS

| | | |
|---|---|---|
| EP | 1 842 875 A1 | 10/2007 |
| JP | 07-118443 | 5/1995 |
| JP | 09-059432 | 3/1997 |
| JP | 11-199709 | 7/1999 |
| JP | 2001-247721 | 9/2001 |
| JP | 2004211048 | 7/2004 |
| JP | 2004211048 A * | 7/2004 |
| JP | 2004-217876 | 8/2004 |
| JP | 2004-285336 | 10/2004 |
| JP | 2004-339466 | 12/2004 |
| JP | 2004-339467 | 12/2004 |
| JP | 2004339467 A * | 12/2004 |
| JP | 2005-133017 | 5/2005 |

OTHER PUBLICATIONS

Translation of JP2004-211048, Jul. 29, 2004.*
Translation of JP 2004-339467, Dec. 2, 2004.*
Supplementary Euorpean Search Report which issued in connection with corresponding European Patent Application No. EP 07 70 6786 on Jun. 24, 2010.

* cited by examiner

*Primary Examiner*—Ling-Siu Choi
*Assistant Examiner*—Hui Chin
(74) *Attorney, Agent, or Firm*—Clark Hill PLC

(57) ABSTRACT

The invention has an object to provide a rubber composition for tire with improved processability and abrasion resistance. The invention relates to a rubber composition for tire, comprising: (a) 5-90 weight parts of a high cis polybutadiene having a cis structure in a proportion of 95 wt % or higher in a microstructure analysis; (b) 90-5 weight parts of a diene-based rubber other than (a); and (c) 1-100 weight parts of a reinforcing agent blended in 100 weight parts of a rubber component including (a)+(b). The high cis polybutadiene is synthesized using a cobalt-based catalyst and satisfies the requirements of: (i) a Mooney viscosity (ML) of 40-49; (ii) a molecular weight distribution [Weight average molecular weight (Mw)/Number average molecular weight (Mn)] of 3.0-3.9; and (iii) a velocity dependence index (n-value) of the Mooney viscosity of 2.3-3.0.

12 Claims, No Drawings

RUBBER COMPOSITION FOR TIRE AND TIRE

TECHNICAL FIELD

The present invention relates to a rubber composition for tire and tire, with excellent mixing processability and improved abrasion resistance, which can be used in tires for tire outer members such as treads and sidewalls and tire inner members such as carcasses, belts and beads.

BACKGROUND ART

A polybutadiene has a bonded portion generated through polymerization at 1,4-site (1,4-structure) and a bonded portion generated through polymerization at 1,2-site (1,2-structure) of butadiene, which are so-called microstructures and coexist in a molecular chain. The 1,4-structure can be further classified into two types: a cis-structure and a trans-structure. On the other hand, the 1,2-structure is structured to have a vinyl group in a side chain.

As known, polybutadienes different in the above microstructures can be produced depending on polymerization catalysts and polymerization conditions and have been employed for various uses in accordance with the properties thereof.

For the purpose of improving the abrasion resistance and heat built-up property of tires, blending a polybutadiene rubber (BR) in natural rubber or the like has been widely implemented and examples of the BR have been proposed variously. For example, JP 7-118443A (Patent Document 1) discloses a BR having a weight average molecular weight of 500,000-750,000, a molecular weight distribution of 1.5-3.0, and an intrinsic viscosity of 90 or more. JP 2001-247721A (Patent Document 2) discloses a BR having a cis-content of 95% or more, and a molecular weight distribution of 3.5-6.0. JP 2004-339467A (Patent Document 3) discloses a BR having a cis-content of 95% or more, a mooneey viscosity (ML) of 30-42, a ratio of a 5% toluene solution viscosity to ML of 1.8-5.0, and a molecular weight distribution of 2.5-3.8.

For the purpose of improving the abrasion resistance and flex cracking resistance of tires, JP2004-339466A (Patent Document 4) discloses a BR having a cis-content of 95% or more, a ML viscosity of 50-70, a ratio of a 5% toluene solution viscosity to ML of 1.8-5.0, and a molecular weight distribution of 1.8-3.8.

The BR for use in tires has a problem because an increased molecular weight improves the abrasion resistance while it deteriorates the processability. In contrast, a widened molecular weight distribution improves the processability while it deteriorates the abrasion resistance and rebound. Thus, there is a need for improving the processability and abrasion resistance.

Patent Document 1: JP 7-118443A
Patent Document 2: JP 2001-247721A
Patent Document 3: JP 2004-339467A
Patent Document 4: JP 2004-339466A

DISCLOSURE OF THE INVENTION

Problem to be Solved by the Invention

The present invention has an object to provide a rubber composition for tire and tire, with improved processability and abrasion resistance.

Means to Solve the Problem

To achieve the above object, the present invention relates to a rubber composition for tire, comprising: (a) 5-90 weight parts of a high cis polybutadiene having a cis structure in a proportion of 95 wt % or higher in a microstructure analysis; (b) 90-5 weight parts of a diene-based rubber other than (a); and (c) 1-100 weight parts of a reinforcing agent blended in 100 weight parts of a rubber component including (a)+(b), wherein the high cis polybutadiene is synthesized using a cobalt-based catalyst and satisfies the requirements of: (i) a Mooney viscosity (ML) of 40-49; (ii) a molecular weight distribution [Weight average molecular weight (Mw)/Number average molecular weight (Mn)] of 3.0-3.9; and (iii) a velocity dependence index (n-value) of the Mooney viscosity of 2.3-3.0 (the n-value is represented by Expression 2).

(Expression 2)

$$\log(ML) = \log(K) + n^{-1} \times \log(RS) \tag{1}$$

(where RS indicates revolutions per minute of a rotor; and K an arbitrary number).

In the above rubber composition for tire, the high cis polybutadiene (a) has a ratio (Tcp/ML) of a 5 wt % toluene solution viscosity (Tcp) to the Mooney viscosity (ML) of 2.5-3.5.

In the above rubber composition for tire, the high cis polybutadiene (a) has a Mw of 500,000-700,000 and a Mn of 120,000-250,000.

In the above rubber composition for tire, the reinforcing agent (c) includes carbon black and/or silica.

In the above rubber composition for tire, the diene-based rubber (b) includes natural rubber and/or polyisoprene rubber.

The invention also relates to a tire containing the above rubber composition for tire as a rubber base.

Effect of the Invention

In the present invention, the polybutadiene composition is composed of a rubber component including a specific high cis polybutadiene and a reinforcing agent, and the rubber component can be mixed well with the reinforcing agent from the beginning of mixing. Therefore, it is possible to provide a polybutadiene composition suitable for tire and tire, with excellent processability and improved abrasion resistance.

The polybutadiene of the present invention has the following properties.

The Mooney viscosity (ML) is preferably 40-49, and more preferably 40-47. A larger Mooney viscosity than the above range may deteriorate the mixing processability while a smaller one than the above range may lower the abrasion resistance undesirably.

The molecular weight distribution [Weight average molecular weight (Mw)/Number average molecular weight (Mn)] is 3.0-3.9, and more preferably 3.0-3.6. A larger molecular weight distribution than the above range may lower the abrasion resistance while a smaller one than the above range may deteriorate the roll mill processability undesirably.

The weight average molecular weight (Mw) is preferably 500,000-700,000, and more preferably 550,000-650,000. A larger one than the above range may lower the roll mill processability while a smaller one than the above range may lower the abrasion resistance undesirably.

The number average molecular weight (Mn) is preferably 120,000-250,000, and more preferably 150,000-220,000. A larger one than the above range may lower the roll mill processability while a smaller one than the above range may lower the abrasion resistance undesirably.

The velocity dependence index (n-value) of the Mooney viscosity is 2.3-3.0, preferably 2.4-2.9, and more preferably 2.4-2.8. A smaller n-value than 2.3 worsens the ability incorporated into compound of filler while a large one than 3.0 lowers the rebound resilience undesirably.

The n-value is determined from the degree of branching and the molecular weight distribution in the polybutadiene and is not correlated with the Mooney viscosity. A larger degree of branching or molecular weight distribution of the polybutadiene increases the n-value while a smaller degree of branching or molecular weight distribution decreases the n-value.

The range of the n-value may be operated in the following two stages because it is required to optimize the molecular weight distribution. First, in a butadiene polymerization stage, polybutadienes of several types with smaller n-values and different molecular weights are polymerized. Next, the polybutadienes of several types with different molecular weights are blended to widen the molecular weight distribution to adjust the n-value of polybutadiene within an appropriate range. The n-value in the polymerization stage can be adjusted with a mixed molar ratio of an organoaluminum compound serving as co-catalyst to water. In a word, an increased amount of water added to a certain amount of the organoaluminum compound reduces the mixed molar ratio, and as the mixed molar ratio becomes smaller, the n-value tends to become smaller. The mixed molar ratio of the organoaluminum compound serving as co-catalyst to water in the polymerizing stage is preferably 2.0 or lower, and particularly preferably 1.0-1.5. A mixed molar ratio of 2.0 or higher makes the n-value too large while a mixed molar ratio lower than 1.0 may extremely lower the polymerization activity undesirably.

The 5% toluene solution viscosity (Tcp) and the Mooney viscosity (ML) have a ratio (Tcp/ML), which is preferably 2.5-3.5, and more preferably 2.5-3.0.

A larger Tcp/ML ratio than the above range increases the cold flow property of a raw rubber while a smaller one than the above range lowers the abrasion resistance undesirably.

The cis-1,4 content is preferably 95% or higher, more preferably 97% or higher, and particularly preferably 98% or higher. A lower cis-1,4 content than the above deteriorates the abrasion resistance undesirably.

The above polybutadiene can be produced in the presence of a cobalt-based catalyst. An example of the cobalt-based catalyst composition includes a catalytic system composed of (A) a cobalt compound, (B) a halogen-containing organoaluminum compound, and (C) water.

The cobalt compound preferably employs salts and complexes of cobalt. Particularly preferable examples include cobalt salts such as cobalt chloride, cobalt bromide, cobalt nitrate, cobalt octylate (ethylhexanoate), cobalt naphthenate, cobalt acetate, and cobalt malonate; cobalt bisacetyl acetonate, and cobalt trisacetyl acetonate; acetoacetic acid ethyl ester cobalt; an organic basic complex such as a pyridine complex or picoline complex of a cobalt salt; and an ethyl alcohol complex.

Examples of the halogen-containing organoaluminum include trialkyl aluminum or dialkyl aluminum chloride, dialkyl aluminum bromide, alkyl aluminum sesquichloride, alkyl aluminum sesquibromide, and alkyl aluminum dichloride.

Examples of specific compounds include trialkyl aluminum such as trimethyl aluminum, triethyl aluminum, triisobutyl aluminum, trihexyl aluminum, trioctyl aluminum, and tridecyl aluminum.

The halogen-containing organoaluminum further include organoaluminum halides such as dialkyl aluminum chlorides such as dimethyl aluminum chloride and diethyl aluminum chloride, sesquiethyl aluminum chloride, and ethyl aluminum dichloride; and hydrogenated organoaluminum compound such as diethyl aluminum hydride, diisobutyl aluminum hydride, and sesquiethyl aluminum hydride. The organoaluminum compounds may be used in combination of two or more.

The molar ratio (B)/(A) between the component (A) and the component (B) is preferably 0.1-5000, and more preferably 1-2000.

The molar ratio (B)/(C) between the component (B) and the component (C) is preferably 0.7-5, more preferably 0.8-4, and particularly preferably 1-3.

Other than the butadiene monomer, they may contain a small amount of: conjugated dienes such as isoprene, 1,3-pentadiene, 2-ethyl-1,3-butadiene, 2,3-dimethylbutadiene, 2-methylpentadiene, 4-methylpentadiene, and 2,4-hexadiene; non-cyclic monoolefins such as ethylene, propylene, butene-1, butene-2, isobutene, pentene-1,4-methylpentene-1, hexene-1, and octene-1; cyclic monoolefins such as cyclopentene, cyclohexene, and norbornene; and/or aromatic vinyl compounds such as styrene, and α-methylstyrene; and non-conjugated diolefins such as dicyclopentadiene, 5-ethylidene-2-norbornene, and 1,5-hexadiene.

Polymerization methods are not limited particularly. For example, bulk polymerization using a conjugated diene compound monomer such as 1,3-butadiene itself as a polymerization solvent, and solution polymerization may be applicable. Examples of the solvent in the solution polymerization include aromatic hydrocarbons such as toluene, benzene, and xylene; aliphatic hydrocarbons such as n-hexane, butane, heptane, and pentane; alicyclic hydrocarbons such as cyclopentane, and cyclohexane; olefin-based hydrocarbons such as the above olefin compounds, cis-2-butene, and trans-2-butene; hydrocarbon-based solvents such as mineral spirit, solvent naphtha, and kerosene; and halogenated hydrocarbon-based solvents such as methylene chloride.

Among those, toluene, cyclohexane, and a mixture of cis-2-butene with trans-2-butene are employed suitably.

Polymerization temperatures preferably fall within a range between −30° C. and 150° C., and particularly preferably within a range between 30° C. and 100° C. Polymerization periods of time preferably fall within a range between one minute and 12 hours, and particularly preferably within a range between five minutes and five hours.

After polymerization for a certain period of time, the inside of the polymerization vessel is depressurized if required, and then post treatments such as steps of cleaning and drying are taken.

Examples of the diene-based rubber (b) of the present invention other than (a) include high cis polybutadiene rubber, low cis polybutadiene rubber (BR), emulsion-polymerized or solution-polymerized styrene butadiene rubber (SBR), natural rubber, polyisoprene rubber, ethylene propylene diene rubber (EPDM), nitrile rubber (NBR), butyl rubber (IIR), and chloroprene rubber (CR).

Derivatives of these rubbers, for example, polybutadiene rubbers modified with tin compounds, or the above rubbers epoxy-modified, silane-modified, or maleic acid-modified may also be used solely or in combination of two or more.

Examples of the reinforcing agent (C) of the present invention include inorganic reinforcing agents such as various types of carbon black and white carbon, activated calcium carbonate, and ultrafine magnesium silicate; and organic reinforcing agents such as polyethylene resin, polypropylene resin, high styrene resin, phenol resin, lignin, modified melamine resin, cumarone indene resin, and petroleum resin. Particularly preferable examples include carbon black having a particle diameter of 90 nm or below and an amount of dibutyl phthalate (DBP) oil absorption number of 70 ml/100 g or more, for example, FEF, FF, GPF, SAF, ISAF, SRF, and HAF. The rubber composition of the present invention has a mixture ratio of: (a) 5-90 weight % of the specific high cis polybutadiene; (b) 90-5 weight % of the diene-based rubber other than (a); and (c) 1-100 weight parts of the reinforcing agent in 100 weight parts of the rubber component including (a)+(b).

More preferably, it has a mixture ratio of: (a) 10-70 weight % of the specific high cis polybutadiene; (b) 90-30 weight % of the diene-based rubber other than (a); and (c) 10-70 weight parts of the reinforcing agent in 100 weight parts of the rubber component including (a)+(b).

The rubber composition of the present invention can be obtained by mixing the above components using a Banbury mixer, an open roll mill, a kneader, or a twin-screw kneaded machine, as generally executed.

The rubber composition of the present invention may contain compounding ingredient kneaded therein, such as a vulcanizing agent, a vulcanization accelerator, an anti-oxidant, a filler, a process oil, zinc white, and a stearic acid, if required, as generally used in the rubber industrial field.

Examples of the vulcanizing agent include publicly known vulcanizing agents, for example, sulfur, organic peroxides, resinous vulcanizing agents, and metal oxides such as a magnesium oxide.

Examples of the vulcanization accelerator include publicly known vulcanization accelerators, for example, aldehydes, ammonias, amines, guanidines, thioureas, thiazoles, thiurams, dithiocarbamates, and xanthates.

Examples of the anti-oxidant include amine-ketone series, imidazole series, amine series, phenol series, sulfur series, and phosphorous series.

Examples of the filler include inorganic fillers such as calcium carbonate, basic magnesium carbonate, clay, litharge, diatomsceous earth; and organic fillers such as reclaimed rubber and powdered rubber.

Examples of the process oil include aromatic series, naphthene series, and paraffin series, either of which may be used.

EXAMPLES

Examples based on the present invention will be described below specifically.

The microstructure was identified in the infrared absorption spectrum analysis. The microstructure was calculated from the absorbed intensity ratio at cis 740 cm$^{-1}$, trans 967 cm$^{-1}$, and vinyl 910 cm$^{-1}$.

The molecular weight (Mw, Mn) was measured through a GPC method: HLC-8220 (available from Toso Inc.) and calculated by standard polystyrene conversion.

The toluene solution viscosity (Tcp) was measured at 25° C. on 2.28 g of the polymer dissolved in 50 ml of toluene using a Canon-Fenske viscometer No. 400 with a viscometer calibration standard solution (JIS Z8809) as the standard solution.

The Mooney viscosity (ML$_{1+4}$, 100° C.) was measured on the raw rubber and compounded materials based on JIS-K6300.

The Mooney viscosity was measured based on JIS-6300 while varying revolutions per minute (1/min) of the rotor. The n-value is given as the inverse of the gradient of a straight line derived from the Mooney viscosity (ML) and the number of revolutions (RS) of the rotor in accordance with Expression 3. In this expression, log(K) indicates an arbitrary number that means an intercept of the straight line.

$$\log(ML)=\log(K)+n^{-1}\times\log(RS) \quad \text{(Expression 3)}$$

Expression 3 can be obtained based on a theoretical equation (Expression 4) of the nth power rule relative to anon-Newton fluid.

$$\gamma=k\tau^n \quad \text{(Expression 4)}$$

where γ: Velocity gradient, τ: Shearing stress, $k^{-1}=\eta$: Viscosity index.

A Laboplast mill (available from Toyo Seiki Seisakusho) was used to mix the raw rubber at a starting temperature of 90 degrees and a certain filling rate for one minute. Thereafter, the period of time was measured after throwing a filler containing carbon black and so forth until the torque rises. The mixing processability is indicated with an index relative to 100 in Comparative example 1 (the smaller the index, the better).

The compound ML is indicated with an index relative to 100 in Comparative example 1 in accordance with the measuring method stipulated under JIS-K6300 (the smaller the index, the better).

The hardness was measured in accordance with the measuring method stipulated under JIS-K6253 using a durometer (type A) and indicated with an index relative to 100 in Comparative example 1 (the larger the index, the higher the hardness).

The 300% tensile stress was measured in accordance with the measuring method stipulated under JIS-K6251 using a No. 3 dumbbell at a tensile rate of 500 mm/min and indicated with an index relative to 100 in Comparative example 1 (the higher the index, the better).

The tensile strength was measured in accordance with the measuring method stipulated under JIS-K6251 using a No. 3 dumbbell at a tensile rate of 500 mm/min and indicated with an index relative to 100 in Comparative example 1 (the higher the index, the better).

The rebound resilience was measured in accordance with the measuring method stipulated under JIS-K6251 through a tripso test and indicated with an index relative to 100 in Comparative example 1 (the higher the index, the better).

The Lambourn abrasion was measured in accordance with the measuring method stipulated under JIS-K6264 at a slip rate of 20% and indicated with an index relative to 100 in Comparative example 1 (the larger the index, the better).

Examples 1-3 and Comparative Examples 1-5

First, cis polybutadienes (Polymerization examples 1-5) were produced for use in Examples 1-3 of the rubber composition for tire according to the present invention and Comparative examples. An agitator-equipped reaction vessel of stainless steel having an inner volume of 1.5 L replaced with a nitrogen gas was prepared. Then, 1.0 L of a polymerization solution (31.5 wt % of butadiene; 28.8 wt % of 2-butens; and 39.7 wt % of cyclohexane) was fed into the vessel. Thereafter, 2.2 mmol of water, 2.9 mmol of diethyl aluminum chloride (the organoaluminum/water mixed molar ratio=1.3), and 0.005 mmol of cobalt octoate with the varied quantity of cyclooctadiene (COD) were added, followed by agitation at 60° C. for 20 minutes to execute 1,4-cis polymerization. Ethanol solution was added to the resultant as an anti-oxidant to terminate the polymerization. Thereafter, the unreacted butadiene and 2-butenes were evaporated/removed to obtain a cis polybutadiene. Table 1 shows cis polybutadienes according to Polymerization examples 1-5, which were obtained by varying the quantity of cyclooctadiene.

TABLE 1

|  | COD (mmol) | Intrinsic viscosity [η] | Mooney viscosity | 5% Toluene solution viscosity | n-value |
|---|---|---|---|---|---|
| Polymerization example 1 | 0.8 | 3.5 | — | — | — |
| Polymerization example 2 | 3.2 | 2.6 | 60 | 156 | 2.0 |
| Polymerization example 3 | 4.0 | 2.5 | 52 | 130 | 2.0 |
| Polymerization example 4 | 16.0 | 1.7 | 27 | 68 | 1.9 |
| Polymerization example 5 | 64.0 | 0.8 | — | — | — |

Next, the cis polybutadienes according to Polymerization examples 1-5 were dissolved and blended in cyclohexane in proportions shown in Table 2 and then the cyclohexane was evaporated/removed to obtain mixed cis polybutadienes according to Trail models 1-4.

TABLE 2

|  | Trial model 1 | Trial model 2 | Trial model 3 | Trial model 4 |
|---|---|---|---|---|
| Polymerization example 1 | 27 | 23 | 18 | 25 |
| Polymerization example 2 | — | — | — | 50 |
| Polymerization example 3 | 50 | 60 | 70 | — |
| Polymerization example 4 | — | — | — | 25 |
| Polymerization example 5 | 23 | 17 | 12 | — |

Next, the blended cis polybutadienes (BR) according to Trail models 1-3 were employed as Examples 1-3 and commercially available cis polybutadienes (BR150L, BR700, BR150B and BR230 all available from Ube Industries, Ltd.) and the blended cis polybutadiene according to Trail model 4 were employed as Comparative examples 1-5. Physical properties of these raw rubbers (BR) were measured. On the basis of the compounding formula shown in Table 3, a Laboplast mill of the BR-250 type (available from Toyo Seiki Seisakusho) was used to mix the raw rubber (BR) and NR for one minute at a temperature of 90 degrees and the number of revolutions of 68 rpm. Thereafter, compounding ingredient except for the vulcanizing agent was thrown and kneaded for four minutes. Next, a 6-inch roll mill was used to mix the vulcanizing agent into the mixed material to produce a compounded material, which was subjected to measurement of the Mooney viscosity. The compounded material was then supplied into a certain mold and press cured at 150° C. for 30 minutes to yield a vucanizate, which was subjected to measurement of the physical property. These results are shown in Table 3.

TABLE 3

|  |  | Examples ||| Comparative examples |||||
|---|---|---|---|---|---|---|---|---|---|
|  |  | 1 | 2 | 3 | 1 | 2 | 3 | 4 | 5 |
|  |  | Example name |||||||||
|  |  | Trial model 1 | Trial model 2 | Trial model 3 | BR150L | BR700 | Trial model 4 | BR150B | BR230 |
| Raw rubber | (1) | 40 | 44 | 47 | 40 | 38 | 60 | 40 | 38 |
|  | (2) | 2.5 | 2.5 | 2.6 | 2.1 | 2.3 | 2.2 | 4.2 | 3.1 |
|  | (3) | 98 | 98 | 98 | 98 | 98 | 98 | 97 | 98 |
|  | Mw (10⁴) | 57 | 60 | 64 | 51 | 51 | 63 | 50 | 63 |
|  | Mn (10⁴) | 17 | 17 | 18 | 22 | 19 | 22 | 16 | 14 |
|  | Mw/Mn | 3.4 | 3.5 | 3.6 | 2.3 | 2.7 | 2.9 | 3.2 | 4.5 |
|  | (4) | 103 | 123 | 139 | 97 | 87 | 200 | 48 | 117 |
|  | Tcp/ML | 2.6 | 2.8 | 3.0 | 2.4 | 2.3 | 3.3 | 1.2 | 3.1 |
| Compounded material | (5) | 57 | 68 | 72 | 100 | 78 | 112 | 93 | 81 |
|  | (6) | 94 | 96 | 98 | 100 | 92 | 110 | 94 | 92 |
| Cured material | (7) | 99 | 100 | 100 | 100 | 99 | 100 | 98 | 98 |
|  | (8) | 97 | 98 | 99 | 100 | 97 | 102 | 96 | 96 |
|  | (9) | 99 | 101 | 100 | 100 | 99 | 102 | 98 | 97 |
|  | (10) | 99 | 100 | 100 | 100 | 98 | 103 | 96 | 95 |
|  | (11) | 104 | 104 | 106 | 100 | 98 | 105 | 88 | 90 |

(1) Moony viscosity (ML)
(2) n-value
(3) Cis-1,4 content (%)
(4) 5% Toluene solution viscosity (Tcp)
(5) Mixing processability
(6) Compounded material ML
(7) Hardness
(8) 300% tensile stress
(9) Tensile strength
(10) Rebound resilience
(11) Lambourn Abrasion Compounding Formula

| | | | |
|---|---|---|---|
| BR/NR | 50/50 | | |
| Carbon black | 50 | SEAST 9H from Tokai Carbon | |
| Aroma oil | 3 | 110 from Esso oil | |
| Zinc oxide | 3 | | |
| Stearic acid | 2 | | |
| Anti-oxidant | 2 | Antigen 6C | |
| (N-(1,3-dimethylbutyl)-N'-phenyl-p-phenylenediamine) | | | |
| Cure promoter | 1 | Nocceler MSA | |
| (N-oxydiethylene-2-benzothiazoylsulfenamide) | | | |
| Sulfur | 1.5 | | |
| 150° C. × 30 min press cure | | | |

The invention claimed is:

1. A rubber composition for tire, comprising: (a) 5-90 weight parts of a high cis polybutadiene having a cis structure in a proportion of 95 wt % or higher in a microstructure analysis; (b) 90-5 weight parts of a diene-based rubber other than (a); and (c) 1-100 weight parts of a reinforcing agent blended in 100 weight parts of a rubber component including (a)+(b), wherein the high cis polybutadiene is synthesized using a cobalt-based catalyst and satisfies the requirements of: (i) a Mooney viscosity (ML) of 40-49; (ii) a molecular weight distribution [Weight average molecular weight (Mw)/Number average molecular weight (Mn)] of 3.0-3.9; and (iii) a velocity dependence index (n-value) of the Mooney viscosity of 2.3-3.0 (the n-value is represented by Expression 1):

(Expression 1)

$$\log(ML) = \log(K) + n^{-1} \times \log(RS) \qquad (1)$$

(where RS indicates revolutions per minute of a rotor; and K an arbitrary number).

2. The rubber composition for tire according to claim 1, wherein the high cis polybutadiene (a) has a ratio (Tcp/ML) of a 5 wt % toluene solution viscosity (Tcp) to the Mooney viscosity (ML) of 2.5-3.5.

3. The rubber composition for tire according to claim 1, wherein the high cis polybutadiene (a) has a Mw of 500,000-700,000 and a Mn of 120,000-250,000.

4. The rubber composition for tire according to claim 2, wherein the high cis polybutadiene (a) has a Mw of 500,000-700,000 and a Mn of 120,000-250,000.

5. The rubber composition for tire according to claim 1, wherein the reinforcing agent (c) includes either one or more of carbon black and silica.

6. The rubber composition for tire according to claim 2, wherein the reinforcing agent (c) includes either one or more of carbon black and silica.

7. The rubber composition for tire according to claim 4, wherein the reinforcing agent (c) includes either one or more of carbon black and silica.

8. The rubber composition for tire according to claim 1, wherein the diene-based rubber (b) includes either one or more of natural rubber and polyisoprene rubber.

9. The rubber composition for tire according to claim 2, wherein the diene-based rubber (b) includes either one or more of natural rubber and polyisoprene rubber.

10. The rubber composition for tire according to claim 4, wherein the diene-based rubber (b) includes either one or more of natural rubber and polyisoprene rubber.

11. The rubber composition for tire according to claim 5, wherein the diene-based rubber (b) includes either one or more of natural rubber and polyisoprene rubber.

12. A tire containing the rubber composition for tire according to claim 1 as a rubber base.

* * * * *